C. DONGES.
GAS HEATED SOLDERING IRON.
APPLICATION FILED NOV. 10, 1917.
1,283,697.
Patented Nov. 5, 1918.
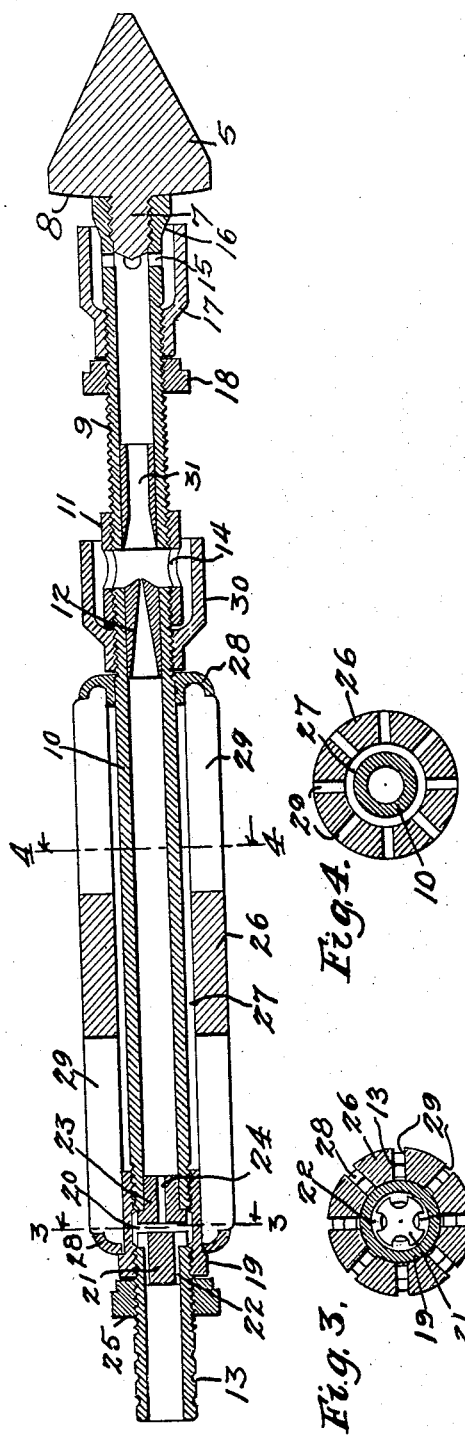
INVENTOR.
C. DONGES
BY John O. Seifert
ATTORNEY

UNITED STATES PATENT OFFICE.

CHRISTIAN DONGES, OF NEW YORK, N. Y.

GAS-HEATED SOLDERING-IRON.

1,283,697.  Specification of Letters Patent.  Patented Nov. 5, 1918.

Application filed November 10, 1917. Serial No. 201,253.

*To all whom it may concern:*

Be it known that I, CHRISTIAN DONGES, a citizen of the United States, and a resident of the borough of Bronx, in the county of Bronx, city and State of New York, have invented certain new and useful Improvements in Gas-Heated Soldering-Irons, of which the following is a specification.

This invention relates to gas heated soldering irons and it is the object of the invention to improve the general construction of soldering irons of this character to cheapen the cost of manufacture and increase the efficiency thereof in operation.

In the drawing accompanying and forming a part of this specification Figure 1 is a longitudinal sectional view of a gas heated soldering iron showing an embodiment of my invention.

Fig. 2 is a side elevation.

Fig. 3 is a cross sectional view taken on the line 3—3 of Fig. 1 and looking in the direction of the arrow; and Fig. 4 is a cross sectional view taken on the line 4—4 of Fig. 1 looking in the direction of the arrows.

Similar characters of reference designate like parts throughout the different views of the drawing.

The embodiment of my invention shown in the drawing comprises a conically shaped soldering head 5 of suitable material having a flattened portion 6 and a threaded projection 7 extending from the rear with the head forming an annular shoulder 8 around said projection. The head 5 is connected to one end of a chamber in the form of a tube 9 in which the gaseous mixture or fuel is mixed by the head projection 7 threading into and closing one end of the tube 9 with the annular shoulder 8 extending laterally of the chamber.

The mixing chamber is connected to the gas supply through a tube 10 connected to the mixing chamber by a coupling 11. The tube 10 has a restricted outlet 12 leading into the mixing chamber, this outlet being in the form of an elongated conical or tapering port in a nipple secured in the tube 10. The opposite end of the tube 10 is adapted to be connected to the source of gas supply by suitable means such as a flexible hose (not shown) by a coupling 13. The coupling or union 11 has a series of circumferentially disposed ports 14 to serve as an air inlet or inlets to the mixing chamber, these inlets being adjacent the gas inlet to the mixing chamber. The mixing chamber also has at the end opposite to the gas and air inlets and adjacent the soldering head 5 a series of circumferentially disposed ports 15 which are in the nature of a burner port or ports.

To direct the flame at the burner ports to the rear of the soldering head or the annular shoulder 8 the mixing chamber forward of the burner ports has a conical diverging surface 16 and a deflector 17 is adjustably mounted on the chamber to direct the flame at the burner ports over the conical or beveled surface 16 to the annular shoulder 8 of the soldering head. This deflector comprises a tubular member or ferrule having threaded connection with the exterior of the mixing chamber at one end and the opposite or forward end spaced from the chamber and open as clearly shown in Fig. 1, the deflector being locked in adjusted position by a nut 18.

In operation the gas enters the tube 10 and due to the tapering form of the outlet 12 the velocity of the gas is greatly increased as it passes through said outlet and is ejected into the mixing chamber in a fine jet or stream and centrally of the mixing chamber, this jet of gas creating a sucking action and drawing air through the ports 14 into the mixing chamber, said incoming air thoroughly mixing with the gas in the chamber 9 before it reaches the burner ports 15 and the gaseous mixture or fuel passing through the burner ports. As the gaseous mixture is ignited the flame will be directed by the deflector 17 over the conical surface 16 against the shoulder 8 of the soldering head. The adjustment of the deflector serves to regulate the size of the flame and directs the flame to the periphery of the head shoulder or toward the axis of the head as desired. To facilitate the flow of air through the ports 14 there is provided within the tube 9 a short tubular member 31 extending from adjacent the ports 14 with the inner surface of the said tube tapering inward from a point adjacent the ports.

To regulate the flow of gas to the tube 10 from the source of gas supply the coupling 13 is connected to the tube 10 by a union 19 screw threaded on to the end of the tube 10 and the coupling 13 and thereby forming a chamber 20. The coupling 13 has a plug 21 secured therein with a series of circumferentially disposed slots 22 constituting inlets to the chamber 20, and there is secured in the tube 10 a plug 23 having a restricted central port 24 to connect the chamber 20 in the union with the tube 10. It will be obvious that by screwing the coupling 13 into or out from the union 19 the area of the chamber 20 and the inlet to the port 24 will be increased or decreased and thereby the flow of gas through the plug port 24 controlled. The coupling 13 is locked in adjusted position by a nut 25 having threaded connection with the coupling 13 coöperating with the union 19.

To manipulate the soldering iron it is provided with a hand grip 26 of suitable heat resisting material, such as wood. This hand grip is mounted upon the tube 10 with the latter extending therethrough and spaced therefrom, as shown at 27, by metal ferrules 28 one at each end of the grip. To facilitate the radiating of any heat and cooling of the tube 10 the hand grip has a plurality of longitudinal slots 29 extending from opposite ends to adjacent the center thereof.

To prevent the possibility of choking of the air inlets 14 to the mixing chamber by the hand of the manipulator of the soldering iron there is provided a shield 30, said shield comprising a sleeve having threaded connection with the tube 10 at one end and the opposite end extending around and spaced from the ports 14 with the forward end open, as clearly shown in Fig. 1, for the admission of air.

Having thus described my invention, I claim:

1. In a gas heated soldering iron, the combination of a mixing chamber comprising a tube having a gas inlet at one end, an air inlet in the lateral wall of said tube forward of the gas inlet, and burner ports in the lateral wall of the tube adjacent the end opposite the gas inlet; a soldering head connected to the end of the tube having an annular shoulder extending laterally and substantially at right angles to the tube; and a deflector sleeve adjustably mounted on the mixing chamber to extend around said burner ports to direct the flame toward the annular shoulder of the head.

2. In a gas heated soldering iron, the combination of a soldering head; a mixing chamber comprising a tube to one end of which the head is connected with an annular shoulder extending laterally of the tube; a restricted gas inlet to the end of said chamber opposite the head; air inlet ports in the lateral wall of said chamber forward of the gas inlet; a sleeve on the chamber having ports to correspond with the air inlet ports of the chamber, and said sleeve being adjustable to regulate the size of the air inlet ports to the chamber; burner ports in the lateral wall of said chamber adjacent the soldering head; and a deflector sleeve adjustably carried by the chamber to direct the flame toward the annular shoulder of the head.

3. In the gas heated soldering iron, the combination of a soldering head having a threaded stem extending coaxially from the back of the head; a mixing chamber comprising a tube having threaded connection with the stem of the head with the back of the head forming an annular shoulder extending laterally of and substantially at right angles to the tube; a gas conducting tube connected to one end of the chamber opposite to the head and having a restricted outlet into the chamber and arranged to be connected to a source of gas supply; a hand grip mounted on and spaced from said tube; air inlet ports in the lateral wall of said chamber forward of the gas inlet; means on said chamber to regulate the size of said ports; burner ports in the lateral wall of the chamber adjacent the soldering head; a deflector sleeve adjustably mounted on the chamber to extend around the burner ports and direct the flame toward the annular shoulder of the head; and a shield to extend around the air inlet ports to the mixing chamber, substantially as and for the purpose specified.

4. In a gas heated soldering iron, the combination of a soldering head; a mixing chamber to one end of which the head is connected with the head forming an annular shoulder extending laterally of and substantially at right angles to said chamber; a gas conducting tube connected to the mixing chamber opposite to the head with a restricted outlet into said chamber and arranged to be connected at the opposite end to a gas supply; means carried by the tube to regulate the flow of gas therethrough to the mixing chamber; a hand grip mounted on and spaced from the gas conducting tube; air inlets to the mixing chamber in the lateral wall thereof forward of the gas inlet; adjustable means to regulate the size of the air inlets; burner ports in the lateral wall of the chamber adjacent the head; means to direct the flame from the burner ports against the annular shoulder of the head; and a shield for the air inlets to the mixing chamber, substantially as and for the purpose specified.

Signed at New York, in the county and State of New York, this 25th day of January, 1917.

CHRISTIAN DONGES.